US006582633B2

(12) United States Patent
Elfving et al.

(10) Patent No.: US 6,582,633 B2
(45) Date of Patent: Jun. 24, 2003

(54) PROCESS FOR PRODUCING OBJECTS

(75) Inventors: Klas Elfving, Kvissleby (SE); Anna Kron, Sundsvall (SE); Peter Sjögren, Sundsvall (SE); Odd Bjerke, Sundsvall (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/761,530

(22) Filed: Jan. 17, 2001

(65) Prior Publication Data

US 2002/0132100 A1 Sep. 19, 2002

(51) Int. Cl.[7] .................................................. B29C 44/02
(52) U.S. Cl. ........................ 264/53; 264/51; 264/DIG. 6
(58) Field of Search ........................ 264/51, 53, DIG. 6

(56) References Cited

U.S. PATENT DOCUMENTS

| 3,615,942 A | | 10/1971 | Morehouse | 156/79 |
| 3,945,956 A | * | 3/1976 | Garner | 521/88 |
| 4,108,806 A | * | 8/1978 | Cohrs et al. | 521/54 |
| 5,422,380 A | * | 6/1995 | Mendelsohn et al. | 521/107 |
| 6,235,800 B1 | * | 5/2001 | Kyuno et al. | 521/51 |

FOREIGN PATENT DOCUMENTS

| DE | 19531631 | | 3/1997 |
| EP | 0 473 215 | * | 3/1992 |
| EP | 0486080 | | 1/1996 |
| WO | 99/14267 | | 3/1999 |

OTHER PUBLICATIONS

English language abstract of DE 19531631. (1997).
English language abstract of JP 10152575. (1998).
English translation of Japanese Laid–open No. 1998–152575. (Undated).
English language abstract of WO99/46320. (1999).
English translation from Japanese of International Laid–Open No. WO99/46320. (Undated).
English translation from Japanese WO99/43758. (Undated).
English translation of JP Early–Disclosure No. 87–286534. (Undated).

* cited by examiner

Primary Examiner—Allan R. Kuhns
(74) Attorney, Agent, or Firm—David J. Serbin

(57) ABSTRACT

The invention concerns a process for preparation of light weight objects comprising calendering, extrusion, blow or injection moulding a resin of polypropylene, polystyrene, HD polyethylene or copolymers thereof and, admixed therein, thermally expandable microspheres including a thermoplastic polymer shell encapsulating a propellant, at a temperature sufficient to result in expansion of the microspheres, wherein said polymer shell is made of a homo- or co-polymer from ethylenically unsaturated monomers comprising more than 80 wt % of nitrile containing monomers. The invention further concerns light weight objects obtainable by the process.

17 Claims, No Drawings

PROCESS FOR PRODUCING OBJECTS

FIELD OF THE INVENTION

The present invention relates to a process for preparation of light weight objects comprising a step of calendering, extrusion, blow or injection moulding a resin of one or more of polypropylene, polystyrene and HD (high density) polyethylene and, admixed therein, thermally expandable microspheres.

BACKGROUND OF THE INVENTION

Many kinds of objects are produced by calendering, extrusion, blow or injection moulding polypropylene, polystyrene or HD polyethylene resins. However, it is difficult to produce light weight objects of high quality from high melting resins without losing mechanical strength or getting a bad surface finish or sink marks.

DE Patent Specification No. 19531631 discloses that thermoplastic foam can be produced by extrusion or injection moulding bulk plastics like HD polyethylene together with gas- or liquid filled microspheres expanding on heating. It is regarded as necessary to add 5–50 wt % of soft and/or low melting plastic or unvulcanised rubber before the extrusion, blow or injection moulding.

JP laid open patent application, Laid Open No. 1998-152575 discloses extrusion or injection moulding of thermoplastic resins mixed with thermoexpandable microspheres to obtain a foamed product.

However, working polypropylene, polystyrene or HD polyethylene according to the above described processes does generally not give satisfactory low density. Furthermore, discoloration is a serious problem, particularly when the objects are intended to be white.

SUMMARY OF THE INVENTION

It is an object of the invention to provide an improved process for producing light weight objects by calendering, extrusion, blow or injection moulding polypropylene, polystyrene or HD polyethylene resins into which thermally expandable micro spheres have been admixed.

According to the invention it has surprisingly been found that objects of low density and with no or only minor discoloration can be obtained if the resin contains a certain kind of thermally expandable microspheres. Thus, the invention concerns a process for preparation of light weight objects comprising calendering, extrusion, blow or injection moulding a resin of polypropylene, polystyrene, HD polyethylene or copolymers thereof and, admixed therein, thermally expandable microspheres including a thermoplastic polymer shell encapsulating a propellant, at a temperature sufficient to result in expansion of the microspheres, wherein said polymer shell is made of a homo- or co-polymer from ethylenically unsaturated monomers comprising more than 80 wt %, suitably more than 85 wt %, preferably more than 92 wt %, most preferably more than 98 wt % of nitrile containing monomers, or possibly even substantially consisting of nitrile containing monomers. The propellant preferably has a boiling point or boiling point range so a temperature above 50° C., more preferably above 60° C., most preferably above 70° C., but preferably not higher than about 150° C., would be required to evaporate at least 50 wt %, preferably at least 80 wt % of the propellant at atmospheric pressure.

It has been found possible to achieve good results even if the content of thermally expandable microspheres is comparatively low, for example from about 0.2 to about 20 wt %, preferably from about 0.5 to about 10 wt %, most preferably from about 1 to about 5 wt % of the resin.

DETAILED DESCRIPTION OF PREFERRED EMBODIMENTS

Thermally expandable microspheres are known in the art and described in detail in, for example, U.S. Pat. No. 3,615,972, EP 466080, JP laid open patent application, Laid Open No. 87-286534, WO 99/46320 and WO 99/43758, which documents hereby are incorporated by reference. In such microspheres, the propellant is normally a liquid having a boiling temperature not higher than the softening temperature of the thermoplastic polymer shell. Upon heating, the propellant evaporates to increase the internal pressure at the same time as the shell softens, resulting in significant expansion of the microspheres, normally from about 2 to about 5 times their diameter. The temperature at which the expansion starts is called $T_{start}$, while the temperature at which maximum expansion is reached is called $T_{max}$. When $T_{max}$ is exceeded the propellant has been released through the polymer shell to such an extent that the microspheres start to collapse.

For the present invention it is, however, important that the thermoplastic polymer shell of the expandable microspheres comprises a sufficiently high amount of nitrile containing monomers. It is also highly favourable if the boiling point of the propellant is comparatively high.

The nitrile containing monomers used for the polymer shell are preferably mainly selected from one or more of acrylo nitrile, methacrylo nitrile, α-chloroacrylo nitrile, α-ethoxyacrylo nitrile, fumarc nitrile, croto nitrile, most preferably acrylo nitrile, methacrylo nitrile or a mixture thereof. If other ethylenically unsaturated monomers are present, preferably in an amount from 0 to about 5 wt %, most preferably from 0 to about 2 wt %, they are preferably selected from one or more of acrylic esters such as methylacrylate or ethyl acrylate, methacrylic esters such as methyl methacrylate, isobornyl methacrylate or ethyl methacrylate, vinyl chloride, vinylidene chloride, vinyl pyridine, vinyl esters such as vinyl acetate, styrenes such as styrene, halogenated styrenes or α-methyl styrene, butadiene, isoprene, chloroprene, although it is most preferred to only use non halogen containing monomers. The softening temperature of the polymer shell, normally corresponding to its glass transition temperature ($T_g$), is preferably within the range from about 80 to about 200° C., more preferably from about 115 to about 200° C., most preferably from about 130 to about 200° C. Preferably the polymer shell constitutes from about 70 to about 90 wt %, most preferably from about 75 to about 85 wt % of the total microsphere.

It may sometimes be desirable that the monomers for the polymer shell also comprise crosslinking multifunctional monomers, such as one or more of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth) acrylate, 1,10-decanediol di(meth)acrylate, pentaerythritol tri(meth)acrylate, pentaerythritol tetra(meth)acrylate, pentaerythritol hexa(meth)acrylate, dimethylol tricyclodecane di(meth)acrylate, triailyiformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal or triallyl isocyanate. If present, such crosslinking monomers preferably constitutes from about 0.1 to about 1 wt %, most preferably from about 0.2 to about 0.5 wt % of the total amounts of monomers for the polymer shell.

Preferred propellants are selected from liquids or combination of liquids with a boiling point or boiling point range so a temperature exceeding 50° C. would be required to evaporate 50 wt % of the liquid at atmospheric pressure. Examples of such liquids are isooctane, 2,4-dimethylbutane, 2-methylpentane, 3-methylpentane, n-hexane, cyclohexane, heptane and isomers or combinations thereof. Liquids with lower boiling point may be included, but preferably only in combinations with one or more other liquids so the resulting boiling point or boiling point range becomes sufficiently high.

It is particularly favourable if the propellant preferably comprises isooctane, suitably in an amount of more than 50 wt %, preferably more than 55 wt %, more preferably more than about 60 wt % most preferably more than about 70 wt % of, or possibly even substantially consists of isooctane. The propellant may further comprise, preferably up to totally 50 wt %, of one or more of butanes, pentanes, hexanes, heptanes, petroleum distillates or other liquids giving a suitable boiling point range of the propellant. Particularly preferred hydrocarbons for use in combination with isooctane are isobutane, isopentane, n-pentane, n-hexane, petroleum ether and n-heptane.

Suitably the propellant is liquid at room temperature and has a boiling point at atmospheric pressure below the softening point of the polymer shell. Preferably the propellant constitutes from about 10 to about 30 wt %, most preferably from about 15 to about 25 wt % of the total microsphere.

Apart from the polymer shell and the propellant the microspheres may comprise further substances added during the production thereof, normally in an amount from about 1 to about 20 wt %, preferably from about 2 to about 10 wt %. Examples of such substances are solid suspending agents, such as one or more of silica, chalk, bentonite, starch, crosslinked polymers, methyl cellulose, gum agar, hydroxypropyl methylcellulose, carboxy methylcellulosa, colloidal clays, and/or one or more salts, oxides or hydroxides of metals like Al, Ca, Mg, Ba, Fe, Zn, Ni and Mn, for example one or more of calcium phosphate, calcium carbonate, magnesium hydroxide, barium sulphate, calcium oxalate, and hydroxides of aluminium, iron, zinc, nickel or manganese. If present, these solid suspending agents are normally mainly located to the outer surface of the polymer shell. Even if a suspending agent has been added during the production of the microspheres, this may have been washed off at a later stage and could thus be substantially absent from the final product.

Microspheres as described above have comparatively high $T_{start}$ and $T_{max}$, $T_{start}$ is preferably within the range from about 80 to about 200° C., more preferably from about 130 to about 190° C., most preferably from about 150 to about 180° C., while $T_{max}$ preferably is higher than 190° C., most preferably higher than 200° C. Normally $T_{max}$ does not exceed 300° C.

The average particle size of the expandable microspheres is suitably from about 1 to about 500 μm, preferably from about 3 about 100 μm, most preferably from about 5 to about 50 μm. By heating to a temperature above $T_{start}$, it is normally possible to expand the microspheres from about 2 to about 7 times, preferably from about 4 to about 7 times, their diameter.

The microspheres may be produced by the same general methods as described in any one of the earlier mentioned U.S. Pat. No. 3,615,972, EP 456080, JP laid open patent application, Laid Open No. 87-286534, WO 99/46320 and WO 99/43758, i.e. in a process comprising a step of polymerising ethylenically unsaturated monomers in an aqueous suspension in the presence of a propellant to yield microspheres comprising a homo- or co-polymer shell entrapping said propellant, although the amount of nitrile containing monomers and preferably the propellant should be selected as described above.

When producing light weight objects, any conventional machine can be used for calendering, extrusion, blow or injection moulding the resin, and the expandable microspheres may be added to and mixed with the resin at any time. For example, expandable microspheres may be added directly to and mixed with powder or granules of the resin before or after they have been charged to the machine. It is also possible to add the expandable microspheres included in a masterbatch of a resin with lower melting point, such as low melting polyolefines and copolymers thereof, for example EVA (ethyl-vinyl acetate), EBA (ethyl-buthyl acrylate), EMA (ethyl-methyl acrylate), ethylene-octene copolymer or low melting polyethylene. If a masterbatch is used, the content of expandable microspheres therein is preferably from about 10 to about 90 wt %, most preferably from about 20 to about 75 wt %.

When operating the machine, heat is applied to achieve a temperature sufficient for the resin to melt, preferably from about 170 to about 240° C., most preferably from about 190 to about 220° C. Then the actual moulding or calendering takes place, i.e. the melted resin is forced by any suitable means such as a moulding screw through a series of calender rollers or an extrusion die, or is injected into a mould. In calendering the main part of the expansion takes place between the rollers, while in extrusion or moulding the expansion mainly occurs when the pressure is released after passing the dye or within the mould, even if the temperature there is significantly lower. Thus, the main part of the expansion of the microspheres takes place after passing the moulding screw, where fully expanded microspheres otherwise would have been destroyed by the strong shear forces.

It is preferred that the polypropylene, polystyrene, HD polyethylene or copolymer thereof comprises at least 50 mole %, most preferred at least 80 mole % of monomers of any of propylene, styrene or ethylene.

The process of the invention has been found to be particularly advantageous for preparation of light weight objects through injection moulding. It has also been found that high quality objects can be obtained from polypropylene.

The invention also concerns light weight objects of polypropylene, polystyrene, HD polyethylene, or copolymers thereof, formed through calendering, extrusion, blow or injection moulding and comprising expanded microspheres with a polymer shell as defined in the above description, suitably in an amount from about 0.2 to about 20 wt %, preferably from about 0.5 to about 10 wt %, most preferably from about 1 to about 5 wt %. The light weight objects of the invention are obtainable by the above described process.

Light weight objects that can be prepared according to the invention include, for example, sheets, profiles, tubes, bottles and injection moulded articles with several mm of wall thickness.

The invention will be further described through the following Example, which, however, not should be interpreted to limit the scope of the invention. If not otherwise stated, all parts and percentages refer to parts and percent by weight.

EXAMPLE

Trials were made on injection moulding polypropylene (PP) from Amoco Chemicals (500-GA20, melt flow rate of 20 g/10 min, 230° C., 2.16 kg) with a machine Engel ES 330/80 with a clamping force of 80 tons and a screw diameter of 35 mm. The injection speed was 140 mm/s, the mould temperature was 17° C. and the barrel temperature from hopper to nose: 180–210–210–170° C. The objective was to achieve as low weight of the plates as possible maintaining a full mould. Short shots were rejected. Expandable microspheres with a polymer shell made from 100% of acrylonitrile and methacrylonitrile monomers and containing isooctane (b.p. 99° C. as propellant (MS-IO) or isopentane (b.p. 28.5° C.) as propellant (MS-IP) were added directly to and mixed with solid PP granules, which then were injection moulded into plates of the dimension 147× 98×5 mm. The results are shown in the table below.

| Material | Density (kg/m³) | Density reduction (%) | Colour |
|---|---|---|---|
| PP | 900 | | White |
| PP + 1% MS-IO | 760 | 16 | |
| PP + 2% MS-IO | 680 | 24 | |
| PP + 3% MS-IO | 640 | 29 | Pale yellow |
| PP + 4% MS-IO | 580 | 36 | |
| PP + 3% MS-IP | 700 | 22 | Yellow |

It was shown that the process of the invention enables production of light weight objects without sink marks and with no or only minor discoloration. When microspheres with isooctane as propellant were used, the results were, unexpectedly, even better than when microspheres with isopentane as propellant were used.

What is claimed is:

1. A process for preparation of light weight objects comprising calendering, extrusion, blow or injection moulding a resin of polypropylene, polystyrene, HD polyethylene or copolymers thereof and, admixed therein, thermally expandable microspheres including a thermoplastic polymer shell encapsulating a propellant, at a temperature sufficient to result in expansion of the microspheres, wherein said polymer shell is made of a homo- or co-polymer from ethylenically unsaturated monomers comprising more than 85 wt % of nitrile containing monomers.

2. A process as claimed in claim 1, wherein said ethylenically unsaturated monomers comprise more than 92 wt % nitrile containing monomers.

3. A process as claimed in claim 2, wherein said ethylenically unsaturated monomers comprise more than 98 wt % nitrile containing monomers.

4. A process as claimed in claim 1, wherein said propellant has a boiling point or boiling point range so a temperature above 50° C. would be required to evaporate at least 50 wt % of the propellant at atmospheric pressure.

5. A process as claimed in claim 4, wherein said propellant has a boiling point or boiling point range so a temperature above 60° C. would be required to evaporate at least 50 wt % of the propellant at atmospheric pressure.

6. A process as claimed in claim 5, wherein said propellant has a boiling point or boiling point range so a temperature above 70° C. would be required to evaporate at least 50 wt % of the propellant at atmospheric pressure.

7. A process as claimed in claim 4, wherein said propellant comprises isooctane.

8. A process as claimed in claim 7, wherein said propellant comprises more than 50 wt % of isooctane.

9. A process as claimed in claim 8 wherein said propellant comprises more than about 70 wt % of isooctane.

10. A process as claimed in claim 1, wherein said nitrile containing monomers are selected from the group consisting of acrylo nitrile, methacrylo nitrile and mixtures thereof.

11. A process as claimed in claim 1, wherein a $T_{start}$ of the expandable microspheres is within the range from about 80 to about 200° C.

12. A process as claimed in claim 1, wherein the amount of thermally expandable microspheres is from about 0.2 to about 20 wt % of the resin.

13. A process as claimed in claim 1, wherein the resin with microspheres admixed therein, is heated to a temperature from about 170 to about 240° C.

14. A process as claimed in claim 1, wherein the polypropylene, polystyrene, HD polyethylene or copolymer thereof comprises at least 50 mole % of monomers of any of propylene, styrene or ethylene.

15. A process as claimed in claim 1, wherein the light weight object is prepared by injection moulding polypropylene.

16. A process for preparation of light weight objects comprising calendering, extrusion, blow or injection moulding a resin of polypropylene, polystyrene, HD polyethylene or copolymers thereof and, admixed therein, thermally expandable microspheres including a thermoplastic polymer shell encapsulating a propellant with a boiling point or boiling point range above 50° C., at a temperature sufficient to result in expansion of the microspheres, wherein said polymer shell is made of a homo- or co-polymer from ethylenically unsaturated monomers comprising more than 85 wt % of nitrile containing monomers.

17. A process for preparation of light weight objects comprising injection moulding a resin of polypropylene or a copolymer thereof and, admixed therein, thermally expandable microspheres including a thermoplastic polymer shell encapsulating a propellant with a boiling point or boiling point range above 50° C., at a temperature sufficient to result in expansion of the microspheres, wherein said polymer shell is made of a homo- or co-polymer from ethylenically unsaturated monomers comprising more than 85 wt % of nitrile containing monomers.

* * * * *